United States Patent [19]

Nishino et al.

[11] 4,147,835

[45] Apr. 3, 1979

[54] ARTICLE HAVING SELF-CLEANING COATING

[75] Inventors: Atsushi Nishino, Neyagawa; Kazunori Sonetaka; Kunio Kimura, both of Hirakata; Nasaki Ikeda, Moriguchi, all of Japan

[73] Assignee: Matsushita Electric Industrial Co., Ltd., Osaka, Japan

[21] Appl. No.: 788,582

[22] Filed: Apr. 18, 1977

[30] Foreign Application Priority Data

Apr. 20, 1976 [JP] Japan .................................. 51-45089

[51] Int. Cl.² .......................... B32B 9/04; B32B 9/06; B32B 15/04; A21B 1/00
[52] U.S. Cl. .................................... 428/450; 428/469; 428/477; 428/538; 428/539; 252/454; 252/455 R; 252/455 Z; 106/48; 126/19 R; 427/193; 427/279; 427/332
[58] Field of Search ............... 428/450, 469, 477, 538, 428/539; 106/48; 126/19 R; 427/193, 279, 332

[56] References Cited

U.S. PATENT DOCUMENTS

| 3,266,477 | 8/1966 | Stiles ................................. 126/19 R |
| 3,547,098 | 12/1970 | Lee .................................... 126/19 R |
| 3,587,556 | 6/1971 | Moreland ........................... 126/19 R |
| 3,759,240 | 9/1973 | Borowski ........................... 126/19 R |
| 3,939,295 | 2/1976 | Robertson et al. ................ 126/19 R |
| 3,993,597 | 11/1976 | Stiles ................................. 126/19 R |

Primary Examiner—P. C. Ives
Attorney, Agent, or Firm—Burgess, Ryan and Wayne

[57] ABSTRACT

A slip containing a frit and an oxidizing catalyst is sprayed over a substrate and fused at a temperature as low as 550° C. The frit consists of 15-60% by weight of $SiO_2$, 9-35% of $B_2O_3$, 10-30% $Na_2O$, 1-25% of $Al_2O_3$, 0-20% of $Li_2O$, 0-10% of $K_2O$ and 0-10% of CaO but must nave at least two of $Li_2O$, $K_2O$ and CaO. The oxidizing catalyst is $MnO_x$ or $CuCO_3$ $Cu(OH)_2$ or a mixture thereof, the content being preferably between 5 and 50% by weight. The self-cleaning is effected at a temperature as low as at 280° C.

12 Claims, 9 Drawing Figures

ARTICLE HAVING SELF-CLEANING COATING

BACKGROUND OF THE INVENTION

The present invention relates to articles having self-cleaning layers and more particularly to an improvement of self-cleaning layers particularly for use in linings of various cooking utensils.

Of various methods for applying self-cleaning linings to ovens, the most typical method is disclosed in U.S. Pat. No. 3,266,477 to Stiles. Briefly stated, Stiles' method consists of sticking a suitable catalyst to porous substrates or walls of an oven. As a result, a particulate catalyst is exposed on the surfaces of a porous substrate so that the coated surfaces are easily susceptible to abrasion and wear by friction during use and consequently it is extremely difficult to maintain the catalytic oxidizing ability over a long period of time.

The method for solving this problem is disclosed in U.S. Pat. No. 3,547,098 to Lee. Briefly stated, the method consists of fusing to the operating surface of a cooking oven liner a porcelain enamel coating composed of a frit having had smelted homogeneously therethroughout a suitable oxidation inducing oxide so that the oxide may permanently be carried by the frit. As described in detail in the specification, raw materials of a frit and a catalyst are smelted at 2,350° F., quenched (fritted) in cold water, and dried in a drier at 200° F. The frit is milled using a clayless mill addition, and the enamel is milled, sprayed over a substrate and fused at 1,400° F.

This method is very advantageous in that a catalyst may be homogeneously smelted and supported in a highly reliable manner, but some serious difficulties arise when the oxidation inducing metal oxides are heated in excess of a vitrification temperature (higher than 1,200° C.) because almost all of the metal oxides react with a frit and are converted into spinel type compounds which are very stable chemically so that their catalytic activities are inevitably reduced to one half to one third of their inherent activities. In addition, a catalyst is homogeneously smelted in a frit so that it is not preferable to directly fuse the frit to a metal substrate because of the corrosion problem. As a result, the metal substrate must be coated with porcelain prior to the fusion step.

Furthermore, since a frit contains a relatively large amount of catalyst or oxidation inducing metal oxide the frit must be fused at a high temperature, higher than 700° C., in order to obtain better bonding between the porcelain coated substrate and the frit. With a fusing temperature higher than 700° C., it becomes extremely difficult to maintain the dimensional accuracies of parts of an oven within predetermined limits. Even when a working temperature is precisely controlled, a considerable number of oven parts are rejected because of their dimensional defects.

A further method for lining the desired surfaces of an oven with self-cleaning coatings is disclosed in U.S. Pat. No. 3,587,556 to Moreland. Briefly stated, this method consists of a mixture of glass frit and a catalyst both of which are available at the market and fusing this mixture to a panel or substrate provided with a base coat of porcelain enamel. A porous matrix layer of some depth is built up on the overlie in bonded relation with a base enamel layer, the porous matrix layer being formed by the glass frit particles bonding to each other and to the base enamel layer with the catalyst dispersed throughout the matrix.

Moreland's method is by far superior to Lee's method in that an oxidizing catalyst may be supported in an enamel layer in a more activated state and is more advantageous in that the catalytic activity may be preserved for a long period of time.

However, Moreland discloses his invention only with commercially available glass frit materials and catalysts and does not teach the composition of the glass frit materials especially. In other words, the composition of the glass frit materials with which his invention may be most effectively practiced is not disclosed at all.

The present invention was made to solve the above and other defects encountered in the prior art cooking utensils having self-cleaning walls or linings. After the extensive studies and experiments the inventors succeeded to provide frits which may be fused at a lower temperature and which may substantially overcome the pollution and food-poisoning problems.

Enamel frits which are used for lining self-cleaning cooking utensils must meet the following conditions:
(1) The slip containing an oxidizing catalyst must be fused at a temperature as low as possible.
(2) The frit must not contain a compound or compounds which will cause pollution problems.
(3) Strong bonding must be obtained between the substrate and the self-cleaning coating.
(4) The self-cleaning coating must not cause corrosion of the substrate.
(5) The self-cleaning coating must have a greater surface area and must exhibit excellent resistance to abrasion and wear.
(6) The solubility to water of the self-cleaning coating must be as low as practicable.

The above conditions will be described in more detail. First it is preferable to fuse a frit containing an oxidizing catalyst at as low a temperature as practicable to a wall surface of a cooking utensil such as an oven because a high fusion temperature results in deformation of metal substrates with resultant unacceptable dimensional accuracies. In order to solve this problem, a metal substrate having a greater thickness must be used. Furthermore, with the increase in fusing temperature the capital cost of a furnace will increase and the fuel cost per part will also increase.

As to the oxidizing catalysts, almost all of the self-cleaning cooking utensils commercially available use copper oxides CuOx and manganese oxides MnOx in order to avoid food poisoning and because the walls of cooking utensils such as ovens are colored dark in order to make food soils invisible. Of various manganese oxides, it is electrolytically produced manganese dioxide $\Gamma$-MnO$_2$ that has the catalytic property. $\gamma$-Manganese dioxide is transformed as follows:

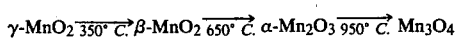

Of these manganese oxides it is $\gamma$-MnO$_2$ that is most active and the largest surface area. In FIG. 5 there is shown the relationship between the ambient temperature (° C.) and the surface area of $\gamma$-MnO$_2$. In the measurement, $\gamma$-MnO$_2$ was heated for 0.5 hour at each of the measured temperatures and the surface area was measured by the BET method. From FIG. 1 it is readily understood that it is preferable to reduce a fusing temperature as low as possible. In addition, strong bonding must be obtained between a self-cleaning coating and a metal substrate. In view of the above, commercially available frits to be fused to steel plates are not preferable to be used in lining self-cleaning cooking utensils because their fusing temperatures range between 830° and 890° C. Commercially available frits which may be fused at lower temperatures are frits containing lead, phosphoric acid or borosilicates, but the lead base frits are not preferable because of the food poisoning problem. The phosphoric acid base frits are also not preferable because the pollution problems arise in the production and the production itself becomes dangerous. In addition, their costs are expensive. From the standpoint of the pollution and food poisoning problems, the use of borosilicates base frits must be avoided because currently available frits contain pollutants such as PbO, $Sb_2O_3$, CdO and the like.

As described above, currently commercially available frits are all not preferable because of the pollution and food poisoning problems.

SUMMARY OF THE INVENTION

One of the objects of the present invention is therefore to provide articles and especially cooking utensils lined with self-cleaning coatings composed of catalysts and enamel frits both of which will not cause pollution and food poisoning problems.

Another object of the present invention is to provide frits which may be fused at a temperature lower than 600° C. so that the desired catalytic activity may be maintained for a long time and that substrates or molded metal parts of cooking utensils may be maintained within tolerable dimensional limits after fusing.

A further object of the present invention is to provide frits with an improved expansion coefficient so that they may be easily fused to not only the conventional porcelain coated steel or iron plates but also to aluminum, aluminum-plated steel plates and the like with a bond and consequently prolong the lifetime of the self-cleaning coating.

A further object of the present invention is to provide a self-cleaning coating which may attain satisfactory self-cleaning at low temperatures.

DETAILED DESCRIPTION OF THE INVENTION

Figure 1:
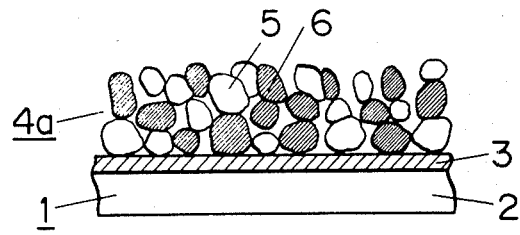
FIGS. 1 through 4 are schematic sectional views of substrates applied with a self-cleaning coating in accordance with the present invention.

Various factors which influence the characteristics and properties of self-cleaning coatings or layers will be described.

(1) Of Thermal Expansion Coefficient and Softening Point of Frits (a) Typical substrates to be lined with a self-cleaning coating are made of steel, iron, copper and aluminum. and Within the temperature range between 100° and 600° C. the iron has a thermal expansion coefficient of 130 to 150 × $10^{-7}$ deg$^{-1}$, the copper, 170 to 180 × $10^{-7}$ deg$^{-1}$, and the aluminum, 200 to 300 × $10^{-7}$ deg$^{-1}$. Therefore the thermal expansion coefficient of a frit must be controlled depending upon the substrate selected and the temperatures at which the articles lined with the self-cleaning coating are to be used.

In general, the thermal expansion coefficient of frits are obtained from the following empirical rule:

$$\alpha = \overset{n}{\Sigma} a_n P_n$$

where
a = factor affecting the thermal expansion coefficient of a frit depending upon the content of oxides, and
P = weight percent of each ingredient.

In Table-1 there are shown typical consituents or ingredients of a frit and their factors affecting the thermal expansion coefficient of the frit.

Table-1

| Ingredients | Factors affecting thermal expansion coefficient |
|---|---|
| $SiO_2$ | 0.5 × $10^{-8}$ |
| $B_2O_3$ | 0.33 × $10^{-8}$ |
| $Al_2O_3$ | 5.5 × $10^{-8}$ |
| $Na_2O$ | 51 × $10^{-8}$ |
| $K_2O$ | 42 × $10^{-8}$ |
| $Li_2O$ | 55 × $10^{-8}$ |
| CaO | 16 × $10^{-8}$ |

With Table-1, the composition of a frit having a desired thermal expansion coefficient may be prepared. For instance, with a steel substrate, it is preferable to use a frit having a thermal expansion coefficient of 85 to 150 × $10^{-7}$ deg$^{-1}$ which is close to that of about 120 × $10^{-7}$ deg$^{-1}$ of the steel substrate.

However, the interior walls of the self-cleaning cooking utensils are not directly subjected to flames and are normally maintained at a temperature between 200° and 350° C. so that the thermal impact exerted on them is relatively mild. Therefore the frits with a thermal expansion coefficient of 120 to 180 × $10^{-7}$ deg$^{-1}$ may be fused to both steel and aluminum substrates.

(b) In view of the catalytic activity and the dimensional tolerances of substrates after fusing, it is preferable for frits to have a suitable sofening point and not to be fused or used at excessively high temperatures. For instance, an aluminum substrate has a softening point of 685° C. so that the fusion or fusing temperature of a frit must be of the order of 620° C. at the highest in order to avoid deformation of the substrate. For instance, when the surface temperature of an interior wall of a cooking utensil such as an electric oven is taken into consideration, a frit must be fusable at a temperature higher than 400° C. Thus the preferable fusion or fusing temperature range is between 400° and 620° C.

(2) Composition of Frits

In addition to the requirement that frits must have a suitable thermal expansion coefficient and a softening point depending upon a selected substrate, they must not contain PbO, P$_2$O$_5$, Sb$_2$O, which are contained in the typical frits with a low softening point but which cause food poisoning.

In Table-2, there are shown compositions and properties of typical frits in accordance with the present invention.

As a consequence an adequate range of the content of SiO$_2$ is between 15 and 60% by weight and more suitably between 40 and 55% by weight.

(b) B$_2$O$_3$

This is one of the most important ingredients which affects not only the bonding between the frit and the Table-2

| No. | SiO$_2$ | B$_2$O$_3$ | Na$_2$O | Li$_2$O | K$_2$O | CaO | Al$_2$O$_3$ | TiO$_2$ | $\frac{SiO_2}{B_2O_3}$ | Softening point °C. | Solubility in water | Bonding to substrate |
|---|---|---|---|---|---|---|---|---|---|---|---|---|
| 1 | 10 | 55 | 24 | 4 | 4 | 3 | | | 0.2 | 530° | X | O |
| 2 | 20 | 45 | 24 | 4 | 4 | 3 | | | 0.4 | 520° | X | O |
| 3 | 30 | 35 | 24 | 4 | 4 | 3 | | | 0.9 | 520° | Δ | O |
| 4 | 40 | 25 | 24 | 4 | 4 | 3 | | | 1.6 | 500° | Δ | O |
| 5 | 50 | 15 | 24 | 4 | 4 | 3 | | | 3.3 | 500° | O | Δ |
| 6 | 55 | 24 | 11 | 4 | 4 | 3 | | | 2.3 | 590° | O | Δ |
| 7 | 48 | 22 | 20 | 4 | 4 | 3 | | | 2.2 | 540° | Δ | O |
| 8 | 41 | 18 | 30 | 4 | 4 | 3 | | | 2.3 | 500° | Δ | O |
| 9 | 34 | 15 | 40 | 4 | 4 | 3 | | | 2.3 | 480° | X | O |
| 10 | 53 | 16 | 25 | | 4 | 3 | | | 3.3 | 570° | O | O |
| 11 | 52 | 15 | 25 | 1 | 4 | 3 | | | 3.5 | 540° | O | O |
| 12 | 51 | 15 | 25 | 2 | 4 | 3 | | | 3.4 | 520° | O | O |
| 13 | 50 | 15 | 24 | 4 | 4 | 3 | | | 3.3 | 500° | O | Δ |
| 14 | 36 | 9 | 24 | 4 | 4 | 3 | 20 | | 4.0 | higher than 600° | O | Δ |
| 15 | 42 | 13 | 24 | 4 | 4 | 3 | 10 | | 3.2 | 540° | O | O |
| 16 | 46 | 14 | 24 | 4 | 4 | 3 | 5 | | 3.3 | 520° | O | O |
| 17 | 46 | 14 | 24 | 4 | 4 | 3 | | 5 | 3.3 | 520° | O | Δ |
| 18 | 42 | 13 | 24 | 4 | 4 | 3 | | 10 | 3.2 | 520° | O | Δ |
| 19 | 34 | 11 | 24 | 4 | 4 | 3 | | 20 | 3.1 | 510° | O | X |
| 20 | 54 | 16 | 26 | | 4 | | | | 3.4 | 560° | O | X |
| 21 | 45 | 14 | 19 | 4 | 5 | 3 | 10 | | 3.2 | 540° | O | O |
| 22 | 50 | 15 | 14 | 4 | 14 | | | | 3.3 | 540° | X | Δ |
| 23 | 50 | 15 | 7 | 4 | 22 | 3 | | | 3.3 | 540° | X | Δ |
| 24 | 45 | 14 | 12 | 4 | 23 | 3 | | | 3.2 | 540° | X | Δ |
| 25 | 50 | 15 | 28 | 4 | | 3 | | | 3.3 | 490° | X | Δ |
| 26 | 50 | 15 | 26 | 4 | 2 | 3 | | | 3.3 | 500° | O | Δ |
| 27 | 53 | 16 | 28 | | | 3 | | | 3.3 | higher than 600° | X | Δ |
| 28 | 53 | 16 | 27 | 4 | | | | | 3.3 | 510° | Δ | X |
| 29 | 53 | 16 | 31 | | | | | | 3.3 | higher than 600° | X | X |
| 30 | 45 | 16 | 31 | | | | 10 | | 3.2 | higher than 600° | X | X |

The solubility in water was measured by immersing 300 mg of a frit into one liter of hot water at 100° C. for two hours. And the mark O indicates a solubility less than 0.5 mg, the mark Δ, a solubility between 0.5 and 2.0 mg, and the mark X, a solubility higher than 2.0 mg. The bonding to the substrates is measured qualitatively, the mark O indicating better, the mark Δ, good and the mark X, poor.

The frits in accordance with the present invention are composed essentially of borosilicates and they contain SiO$_2$, B$_2$O$_3$, Na$_2$O, Al$_2$O$_3$ and at least two ingredients selected from the group consisting of Li$_2$O, K$_2$O and CaO.

These ingredients will be described in detail.

(a) SiO

In general the larger the content of SiO$_2$ in a glass or frit, the smaller the thermal expansion coefficient becomes but the higher the softening point becomes. Since the present invention contemplates providing a frit with a relatively high thermal expansion coefficient but a relatively low softening point, the content of SiO$_2$ must be low.

In Table-2, the contents of SiO$_2$ of frits Nos. 1 through 5 are varied. When the SiO$_2$ content is lower than 15% by weight, the solubility in hot water becomes too high to be used in practice. On the other hand, when the content of SiO$_2$ exceeds 60% by weight, a high softening point and a hard glass composition result so that a content in excess of 60% is not suitable.

substrate but also the viscosity and flowability of glass heated and vitrified at a temperature higher than 1,200° C.

Frits Nos. 1 through 5 have different contents. When the content of B$_2$O$_3$ exceeds 35% by weight, the solubility in water unfavorably increases. On the other hand, when the content is less than 9% by weight as seen in Frit No. 14 other adverse results occur.

The solubility in water is dependent upon the ratios between the contents of SiO$_2$ and B$_2$O$_3$ as will be described in detail hereinafter, and the content of B$_2$O$_3$ is preferably between 9 and 35% by weight and more preferably between 10 and 20% by weight.

(c) Na$_2$O

The content of Na$_2$O is one of the important factors which affect the properties of a frit. From the comparison among Frits Nos. 6 through 9 it is seen that when the content is in excess of 30% by weight the solubility in water unfavourably increases because the alkalinity of a frit increases with the increase in content of Na$_2$O. On the other hand, a content less than 10% by weight is also not preferable because an increase in softening point results. The use of a small quantity of Na$_2$O which has a higher factor influencing the thermal expansion coefficient of a frit is especially disadvantageous. In view of the above, the content of Na$_2$O is preferably between 10 and 30% by weight and more preferably between 15 and 25% by weight.

(d) Li$_2$O

The addition of Li$_2$O results in the remarkable effect of a reduction of the softening point of a frit. The addition of Li$_2$O may cause a decrease in the softening point of a frit without increasing the alkalinity as opposed to Na$_2$O.

From the comparison among Frits Nos. 10 through 13, it is seen that with an increase in content of Li$_2$O the softening point of a frit decreases so that it is preferable to add Li$_2$O up to 20% by weight.

The addition of Li$_2$O results in very favorable effects as described above, but Li$_2$O is expensive. Na$_2$O or K$_2$O may be used instead of Li$_2$O, but from the standpoint of a compromise between the desired results attainable by the addition of Li$_2$O and the cost, it is preferable to add Li$_2$O in the range between 1 to 10% by weight because a stable frit having an adequate low softening point may be prepared.

(e) K$_2$O

In analogy with Na$_2$O and Li$_2$O, the addition of K$_2$O results in not only a lowering of the softening point but also an increase in the thermal expansion coefficient of a frit. In addition, when glass is heated and vitrified at a temperature higher than 1,200° C., the viscosity of glass is decreased so that the workability of vitrified glass may be remarkably improved. However, as seen from the comparison among Frits Nos. 13 and 22 through 26, a content less than 10% by weight of K$_2$O is not preferable. The cost of K$_2$O is high but not as expensive as Li$_2$O so that if the cost consideration permits, the addition of 1 to 7% by weight of K$_2$O results in a stable frit with a low softening point.

(f) CaO

CaO is not an essential ingredient of a frit, but its addition results in an improvement of the bonding between a substrate and a self-cleaning coating as is seen from the comparison of Frits Nos. 10 and 20. Besides, the addition of CaO results in an increase in porosity of a self-cleaning coating and the improvement of self-cleaning capability.

The content of CaO is preferably up to 10% by weight and more preferably between 1 and 5% by weight.

(g) Al$_2$O$_3$

The content of Al$_2$O$_3$ is varied in Frits Nos. 13 through 16 in order to evaluate the effects on the characteristics and properties of frits. In general the frits having a low softening point have a high level of alkaline contents (Na$_2$O, K$_2$O, Li$_2$O and CaO) so that the solubility in water increases disadvantageously. The addition of Al$_2$O$_3$ results in a decrease in solubility to water and improved bonding to a substrate.

Figure 6:
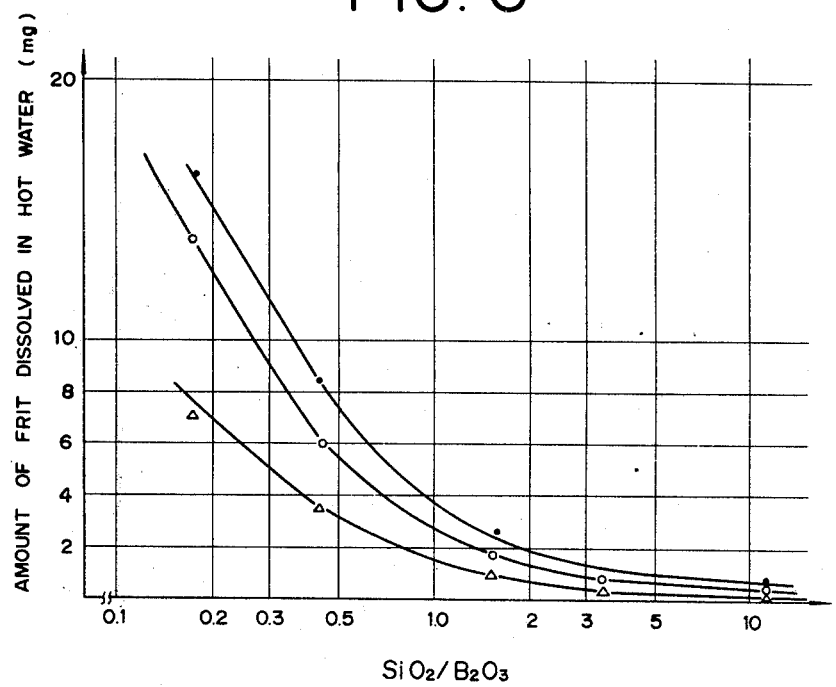
FIG. 6 is a graph showing the relation between the ratio $SiO_2/B_2O_3$ and the solubility in water.

Referring to FIG. 6, curve a indicates the solubility of Frits Nos. 1 through 5 each having a different SiO$_2$/B$_2$O$_3$ ratio. The solubility was measured following the procedure described in conjunction with Table-2. Curve b indicates the solubility in water of frits having the same SiO$_2$/B$_2$O$_3$ ratios as indicated by the curve a and further containing 3% by weight of Al$_2$O$_3$ based on the weight of the frits. Curve c indicates the solubility to water of frits containing 10% by weight of Al$_2$O$_3$.

From FIG. 6, it is seen that the solubility in hot water is extremely low when the ratio SiO$_2$/B$_2$O$_3$ is higher than 2.5 and that this tendency may be further improved by the addition of Al$_2$O$_3$.

In view of the above, the content of Al$_2$O$_3$ is preferably between 1 and 25% by weight and more preferably between 8 and 16% by weight.

(h) TiO$_2$

In general, TiO$_2$ is added to frits mainly as a pigment, but it also serves to improve the bonding between a self-cleaning coating and a substrate and to lower the solubility in water. As seen from Frits Nos. 17 through 19, the effect on bonding by the addition of TiO$_2$ to a frit having a low softening point is not as remarkable as to a frit having a high softening point.

The content of TiO$_2$ is preferably up to 25% by weight and more preferably up to 15% by weight, and the addition of TiO$_2$ is not essential to the practice of the present invention.

The correlation among alkali ingredients Na$_2$O, Li$_2$O, K$_2$O and CaO will be described. The alkalinity of Na$_2$O, K$_2$O, CaO and Li$_2$O decreases in that order while the cost of Li$_2$O, K$_2$O, Na$_2$O and CaO is expensive in that order. Of these ingredients, the addition of Na$_2$O in excess of 30% by weight results in an increase in alkalinity of a resultant frit and adverse effects to a substrate metal. For instance, a frit containing a large amount of Na$_2$O reacts with an aluminum substrate to corrode the substrate. Therefore, in order to suppress the increase of alkalinity, it is preferable to add Li$_2$O. Furthermore, the addition of K$_2$O and CaO also is preferable because the softening point, the thermal expension coefficient, the bonding to a substrate and prevention of corrosion of the substrate may be improved as described hereinbefore. From a comparison among Frits Nos. 10, 20, 25 and 27 through 30, it is seen clearly that if two or three ingredients among Li$_2$O, K$_2$O and CaO are not contained in a frit, the characteristics and properties of the frit are adversely affected.

The raw materials for preparing frits will be described. Silica or silica sand is used for SiO$_2$ and both of them contain impurities such as Fe and Mg less than 1% by weight.

Boric acid and borax are used for B$_2$O$_3$ and they mainly consist of B$_2$O$_3$ and Na$_2$O and rarely contain impurities.

Soda ash (Na$_2$CO$_3$) is mainly used for Na$_2$O and Na$_2$O in borax is additionally used. Both of them rarely contain impurities.

Potassium nitrate and potassium carbonate are used for K$_2$O.

Alumina and feldspar are mainly used as Al$_2$O$_3$ and impurities such as Fe$_2$O$_3$ and MgO are less than 1% by weight.

Li$_2$CO$_3$ and spodumene are mainly used for Li$_2$O. And the major impurities of spodumene are SiO$_2$ and Al$_2$O$_3$ in addition to the minor impurities Fe$_2$O$_3$ and MgO less than 1% by weight.

CaCO$_3$ and lime stone are used for CaO and both have a high purity. Impurities are Fe$_2$O$_3$ and MgO.

The raw materials described above are mixed in a desired composition and melted for vitrification in a melting furnace at a temperature higher than 1,250° C. Molten glass is quenched in cold water and thereafter dried and then milled to a desired particle size. Almost all of the impurities contained in the frit are those contained in the starting raw materials, but their contents are less than 5% by weight. Major impurities are Fe$_2$O$_3$, MgO, ZnO, MnOx, SnO$_2$ and BaO.

In Table-3, there are shown a preferable composition and a more preferable composition of frits in accordance with the present invention and their softening points and thermal expansion coefficients.

Table-3

| | | |
|---|---|---|
| SiO$_2$ | 15–60% by weight | 40–55% by weight |
| B$_2$O$_3$ | 9–35 by weight | 10–20 by weight |
| Na$_2$O | 10–30 by weight | 15–25 by weight |
| Li$_2$O | 0–20 by weight | 1–10 by weight |
| K$_2$O | 0–10 by weight | 1–7 by weight |
| CaO | 0–10 by weight | 1–5 by weight |
| Al$_2$O$_3$ | 1–25 by weight | 8–15 by weight |
| Softening point, °C. | 400°–750° | 450°–620° |
| Thermal expansion coefficient (deg$^{-1}$) | (120°–180°) × 10$^{-7}$ | (140°–160°) × 10$^{-7}$ |

In Table-4, there are shown a composition of a typical frit in accordance with the present invention and its raw materials with a compounding ratio.

Table-4

| Materials (% by weight) | | Composition of Frit (% by weight) | |
|---|---|---|---|
| Silica sand | 42 | SiO$_2$ | 45 |
| Borax | 19 | B$_2$O$_3$ | 14 |
| Sodium carbonate | 20 | Na$_2$O | 19 |
| Lithium carbonate | 10 | Li$_2$O | 4 |
| Potassium nitrate | 9.3 | K$_2$O | 5 |
| Calcium carbonate | 5.3 | CaO | 3 |
| Alumina | 11 | Al$_2$O$_3$ | 10 |

(3) Catalysts

The oxidizing catalysts having the self-cleaning ability are MnOx and CuOx described above and metal oxides such as NiOx, CoOx, SnOx, VOx, MoOx, etc. However, those which cause cancer and pollution problems must be avoided. Furthermore, FeOx are not preferable because of coloring the self-cleaning coating. Noble metal catalysts such as ruthenium, rhodium, palladium, platinum, are very expensive.

When the self-cleaning coating is applied to the cooking utensils the food poisoning and pollution problems, coloring, hardness and self-cleaning ability must be collectively taken into consideration. The most preferable catalysts are MnOx and CuOx.

In view of the purity, the cost, the stability and the catalytic activity, of various manganese oxides MnOx, electrolytic $\gamma$-MnO$_2$ is most preferable, and manganese carbonate and manganese ores also may be used.

As the raw materials for copper oxides CuOx, basic copper carbonate CuCO$_3$ Cu(OH)$_2$ is most preferable, and CuO also may be used. As will be described hereinafter in more detail, basic copper carbonate is especially stable in the form of a colloid in a slip and exhibits excellent self-cleaning ability or catalytic activity after fusion.

When the slip containing such oxidizing catalysts is fused, manganese dioxide transforms mainly into $\beta$-MnO$_2$ and partly into Mn$_2$O$_3$, whereas basic copper carbonate undergoes thermal decomposition at 200° to 250° C. and transforms to copper oxide.

The particle size of these oxidizing catalysts must be such that they must be stable in the form of a colloid in the slip and must exhibit excellent catalytic activities after fusion. Therefore, more than 94% by weight of catalyst particles is preferably less than 325 mesh and their average particle size is preferably between 0.8 and 20 microns. If the average particle size is not within this range, the catalysts in the slip are unstable.

If the particles are coarse, the catalyst particles concentrate at a lower layer of the slip when the latter is prepared so that no stable slip may be obtained. Furthermore, the catalyst particles deposited at the lower layer of the fused coating cannot exhibit satisfactory catalytic activities and in some cases will cause a corrosion of the substrate. On the other hand, when the particle size is very small, the catalyst particles float at the surface of the slip so that a uniform colloid cannot be obtained. In addition, the fused coating does not exhibit a suitable matte surface.

The content of the catalyst is preferably between 5 and 50% by weight based on the total weight of the solid ingredients in the slip such as a frit, a catalyst and additives for forming a matte surface. If the content of the catalyst is less than 5% by weight, no satisfactory catalytic activity is expected and a coloring problem arises. On the other hand, when the content is in excess of 50% by weight, the bonding to the substrate and the mechanical strength of the coating are decreased.

(4) Matte Surface-Forming Materials

It is preferable that the surface of the self-cleaning coating is porous because the catalytic activity may be enhanced. Therefore, it is preferable to disperse solid particles in a frit, for forming a matte surface.

In addition to corundum and silica sand, Al$_2$O$_3$, TiO, SiO and zeolite are used as the matte surface-forming materials which do not cause any food poisoning problem.

The matte surface-forming materials are preferably 43 to 74 microns in particle size and are used in an amount of up to 50% by weight based on the total weight of the solid matter in the slip.

(5) Preparation of Slip and Fusing

A slip for forming a self-cleaning coating is prepared by mixing, at a desired ratio, a frit, a catalyst, water and a matte surface-forming material and a colloid stabilizing agent, if required, and milling in a ball mill. The solid particles in the slip are preferably less than 100 mesh in order to ensure their stability in the form of colloid.

The colloid stabilizing agents are carboxymethyl cellulose, crystallized cellulose, water glass, gum arabic, polyvinyl alcohol, colloidal silica, colloidal alumina and so on. However, when the slip is used within a short time after its preparation, the colloid stabilizing agent is not required.

The slip prepared in the manner described above is sprayed with a conventional spray gun over the surface of a substrate to such a thickness that the self-cleaning coating may have a thickness between 70 and 200$\mu$m. Thereafter, the sprayed slip is fused to the substrate at a temperature close to the softening point of the frit.

(6) Structure of Self-Cleaning Coating:

Referring to FIGS. 1 through 4, the structure of the self-cleaning coating will be described. A substrate 1 which constitutes an interior wall of a cooking utensil consists of a steel plate 2 coated with aluminum 3. In addition, a substrate made of aluminum or an alloy thereof and a substrate consisting of an aluminum-plated steel plate may be used. Furthermore, the conventional steel plates and iron plates coated with porcelain may be used after being surface treated by sand blasting or the like.

A self-cleaning coating 4a consists of frit particles 5 and catalyst particles 6 and the frit particles 5 bond to each other to form a porous structure in which are dispersed and supported the catalyst particles 6. Therefore, the catalyst particles 6 are exposed not only at the surface of the self-cleaning coating 4a but also in the pores of the porous structure described above so that the catalytic activity may be much enhanced.

When the fusing temperature is too high or the fusing time is too long even at suitable temperature, the frit is completely vitrified so that the coating has a smaller surface area and consequently satisfactory catalytic activity cannot be obtained. On the other hand, when the fusing temperature is too low or the fusing time is too short, the mechanical strength, the resistance to abrasion and wear and the bonding to the substrate 1 of the coating 4a are decreased. Therefore, the fusing temperature and time are determined depending upon the softening point, the particle size, the particle size distribution of the frit, the content of the catalyst and its particle size. The self-cleaning coating 4a preferably has a specific surface area between 0.5 and $15m^2/g$.

Figure 2:
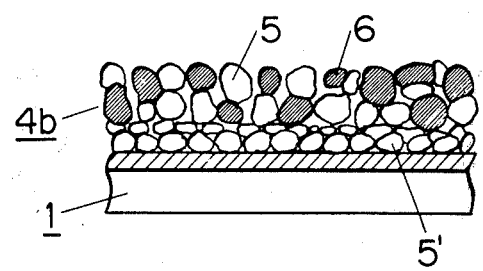

The structure of the self-cleaning coating 4b shown in FIG. 2 is obtained by first spraying only frit particles 5' over the substrate 1 and fusing them thereto and thereafter spraying the frit particles 5 and the catalyst particles 6 and fusing as with the coating 4a shown in FIG. 1. Since the substrate 1 is applied with the base or first coating consisting solely of the frit particles 5', strong bonding can be attained. In addition, the contact of the catalyst particles 6 in the second or finish coating with the substrate 1 can be avoided so that the resistance to corrosion of the substrate 1 may be remarkably improved. Furthermore, the fusing time of the second or finish coating may be shortened to increase the porosity so that a mechanical strength substantially similar to that of the coating shown in FIG. 1 may be attained.

Figure 3:
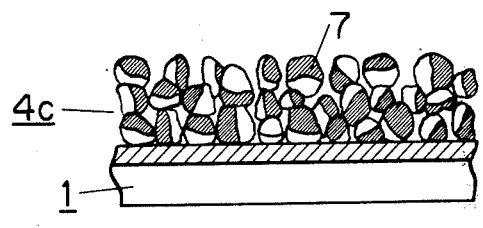

The self-cleaning coating shown in FIG. 3 is formed with frit particles 7 at least partially coated with a catalyst. The catalyst-coated frit particles 7' may be provided by melting the frit, mixing with the catalyst particles, quenching in water, drying and thereafter milling. According to this method of applying the self-cleaning coating, strong bonding is ensured so that the catalytic activity may be considerably enhanced by lowering the fusing temperature and reducing the fusing time.

Figure 4:
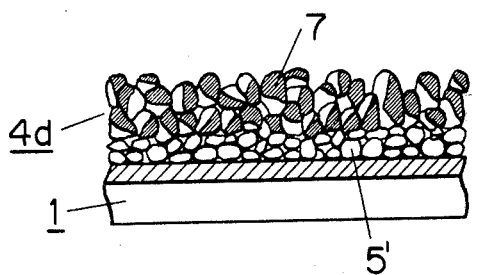
Figure 5:
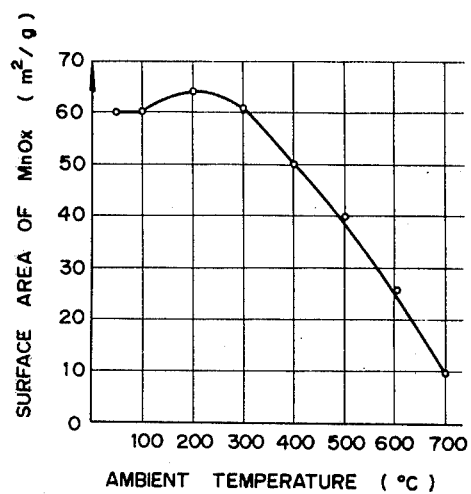
FIG. 5 is a graph showing the relation between the temperatures of an atmosphere surrounding MnOx and their surface areas measured by BET method.

The self-cleaning coating 4d shown in FIG. 4 is made by applying a first base coating consisting of frit particles 5' and applying a second coating consisting of the catalyst-coated frit particles 7 in a manner substantially similar to that described in conjunction with FIG. 3.

The matte surface-forming material such as alumina particles are dispersed together with the frit particles and the catalyst particles in the slip so that they are dispersed in the coating 4a shown in FIG. 1 or the second coating of the coating 4b shown in FIG. 2. The matte surface-forming material may be mixed into the molten glass when the catalyst-coated particles 7 are prepared so that the frit particles coated with the matte surface-forming particles may be provided and the matte surface-forming particles may be dispersed in the coating 4c shown in FIG. 3 or in the second coating of the coating 4d shown in FIG. 4.

EXAMPLE 1

Both surfaces of a steel plate of 0.7 mm in thickness were aluminum plated at a rate of 110 $g/m^2$, and the steel plate was cut into substrates 30 × 100 mm. Various types of self-cleaning coating were applied to one surface of the substrate to provide samples and the self-cleaning ability and the resistance to corrosion were evaluated.

(A) The following ingredients of the slip was weighed and mixed:

| Frit No. 21 in Table-2 | 100 parts by weight |
|---|---|
| $CuCO_3 Cu(OH)_2$ | 15 |
| $\gamma$-$MnO_2$ | 15 |
| alumina particles | 30 |
| water | 80 |
| carboxymethyl cellulose | 3 |

The slip was sprayed over one surface of the substrate, dried and fused for five minutes.

(B) The slip wherein only the frit No. 21 was dispersed was sprayed and fused at 550° C. for 5 minutes to form a first coating 30 to 40 microns in thickness, and thereafter the slip having the sample composition shown in (A) was sprayed and fused at 550° C. for 3 minutes to form a second layer.

(C) The frit No. 21 was melted and the temperature was lowered to 570° to 600° C. $\gamma$-$MnO_2$ and $CuCO_2 Cu(OH)_2$ of each 15 parts by weight based on 100 parts by weight of the frit were mixed with the molten frit, and the mixture was quenched in water, dried and milled. The slip in which was dispersed the frit prepared in the manner described above was sprayed and fused at 540° C. for 5 minutes.

(D) Following the procedure of (B), the first coating of 30 to 40 microns in thickness was applied and thereafter following the procedure of (C), the second coating was applied.

The overall thickness of each sample (A) through (D) was about 130 microns.

(E) This was the sample without self-cleaning coating.

Evaluation:

(a) Salad Oil Test:

50 microliters of salad oil was dropped from a syringe onto the sample and placed in a drier at 280° C. for 30 minutes and the self-cleaning ability was evaluated.

The results are shown in Table-5 where the mark O indicates the surface self-cleaned to such an extent that the surface was completely cleaned without a trace of black, varnish-like carbon. The mark Δ indicates the surface condition wherein a small amount of the residue was left and transformed into varnish to a small extent, whereas the mark X indicates the surface condition wherein the black residue was clearly seen and transformed into varnish.

(b) Meat Tip Test:

Four pieces of chicken meat tips of each about 200 mg were placed on the surface of the sample and placed in a drier at 280° C. for 30 minutes.

The test results are shown in Table-5 where the mark O indicates the completely self-cleaned surface, the mark Δ, the surface condition wherein a small carbon residue was left, and the mark X, the surface condition wherein the residue of carbonized meat was left.

(c) Corrosion Test:

3% aqueous solution of sodium chloride was sprayed on the sample at 75° C. and a time when a corrosion spot was detected was measured. The test results are also shown in Table-5.

Table-5

| Sample | Salad oil test | Meat tip test | Corrosion test |
|---|---|---|---|
| A | O | Δ | 38 hours |
| B | O | O | 95 hours |
| C | O | Δ | 45 hours |
| D | O | O | 110 hours |
| E | X | X | 3 hours |

Figure 7:
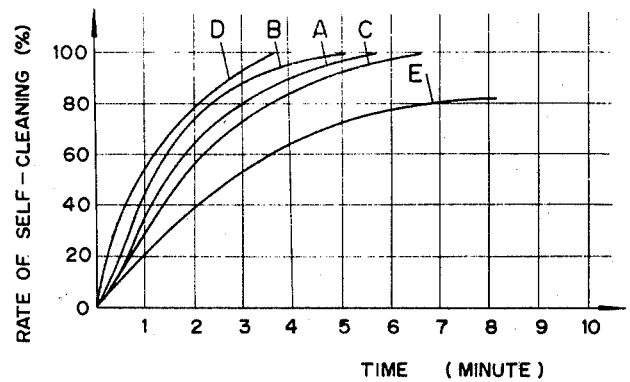
FIG. 7 is a graph showing the relation between the self-cleaning time at 280° C. of some self-cleaning coatings and their self-cleaning rates.

Salad oil was sprayed at a rate of 1 mg/cm² over the surface of each sample A through E and the sample was placed in a drier at 280° C. The relation between the self-cleaning rate and the time placed in the drier is shown in FIG. 7. The self-cleaning rate refers to the decrease in weight of oil per unit time. Therefore, the self-cleaning rate 100% means that there is left no salad oil or its residue on the surface of the self-cleaning coating.

EXAMPLE 2

Into the slip used in Example 1 for preparing the sample A was mixed alumina or titanium oxide as a matte surface-forming agent in various ratios. The slip was sprayed and fused at 540° C. for 5 minutes. The bonding strength as well as the self-cleaning rate were evaluated and the results are shown in Table-6.

Table-6

| Matte surface-forming agents | $Al_2O_3$ | | | | | | | $TiO_2$ | | | | | | |
|---|---|---|---|---|---|---|---|---|---|---|---|---|---|---|
| Content (% by weight) | 0 | 5 | 10 | 20 | 50 | 60 | 70 | 0 | 5 | 10 | 20 | 50 | 60 | 70 |
| Bonding strength | O | O | O | O | O | Δ | X | O | O | O | O | O | Δ | X |
| Self-cleaning ability | Δ | O | O | O | O | Δ | Δ | Δ | O | O | O | O | Δ | Δ |

In Table-6, the contents of the matte surface-forming agent are based on the total weight of the solid particles in the slip. The bonding strength is evaluated qualitatively, the mark O indicating better, the mark Δ, good, and the mark X, poor. In order to evaluate the self-cleaning rate, salad oil was sprayed at a rate of 1 mg/cm² over the self-cleaning coating of each sample and the sample was placed in a drier at 280° C. for 0.5 hour. The self-cleaning rate is evaluated in the same manner as that in Example 1.

EXAMPLE 3

The self-cleaning rates depending upon the types of catalyst are illustrated as follows:

A slip composed of Frit No. 21 in Table-2, a catalyst alumina particles, carboxymethyl cellulose, and water was sprayed over a surface of the substrate prepared in Example 1.

Each sample was sprayed at a rate of 1 mg/cm² with salad oil and was placed in a drier at 280° C. for 0.5 hour, and then the self-cleaning rate was evaluated.

Figure 8:
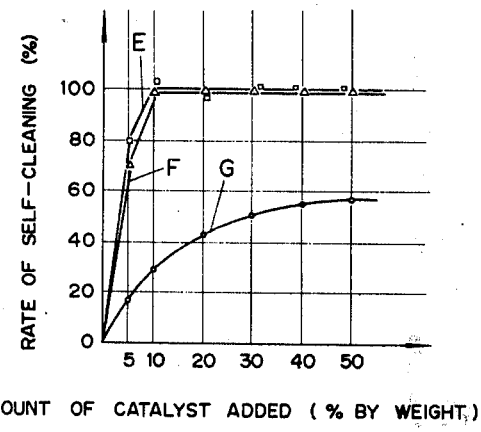
FIG. 8 is a graph showing the relation between the content of a catalyst in a self-cleaning layer and the self-cleaning rate.

The results or the relation between the content of catalyst and the self-cleaning rate is shown in FIG. 8. Curve E indicates the above relation of the self-cleaning coating containing γ-$MnO_2$ as a catalyst; curve F, that of the self-cleaning coating containing $CuCO_3$ Cu(OH)$_2$, and curve G, that of the self-cleaning coating containing CuO. It is seen that $MnO_2$ and $CuCO_3$ Cu(OH)$_2$ are by far superior to CuO. An excellent self-cleaning rate or ability is obtained when the content of catalyst is higher than 5% by weight and more preferably higher than 10% by weight.

Figure 9:
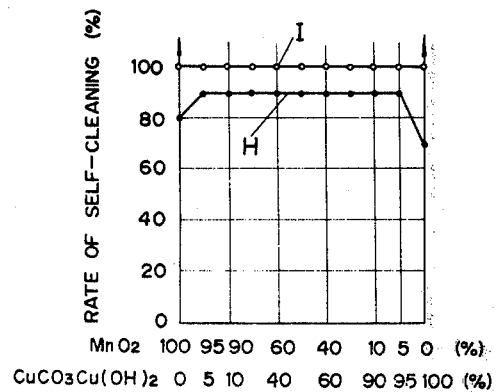
FIG. 9 is a graph showing the relation between a content or ratio of a catalyst in a self-cleaning coating and the self-cleaning rate.

FIG. 9 shows the relation between the self-cleaning rate in % and the ratio between $MnO_2$ and $CuCO_3$ Cu(OH)$_2$ when the content of these catalysts remained constant. Curve H indicates the relation when the content of the catalysts was 5% by weight based on the total weight of the solid particles in the slip, whereas curve I, when content was 10% by weight.

As curve I indicates, it is preferable to use the mixture of $MnO_2$ and $CuCO_3$ Cu(OH)$_2$ when the content of the catalyst is less, because the self-cleaning capability may be much enhanced.

In summary, the present invention provides articles having a self-cleaning coating, the articles of the present invention being preferably used in cooking utensils.

We claim:

1. An article having a self-cleaning coating comprising a substrate having fused thereon a frit consisting essentially of 15 to 60% by weight of $SiO_2$, 9 to 35% by weight of $B_2O_3$, 10 to 30% by weight of $Na_2O$, 1 to 25% by weight of $Al_2O_3$, 0 to 25% by weight of $TiO_2$ and at least two ingredients selected from the group consisting of 0 to 20% by weight of $Li_2O$, 0 to 10% by weight of $K_2O$, and 0 to 10% by weight of CaO; and an oxidizing catalyst selected from the group consisting of the oxides of Mn, Cu, Ni, Co, Sn, V and Mo.

2. An article having a self-cleaning coating as set forth in claim 1 wherein said frit consists essentially of 40 to 55% by weight of $SiO_2$, 10 to 20% by weight of $B_2O_3$, 15 to 25% by weight of $Na_2O$, 8 to 15% by weight of $Al_2O_3$, 1 to 10% by weight of $Li_2O$, 1 to 7% by weight of $K_2O$, and 1 to 5% by weight of CaO, wherein the ratio $SiO_2/B_2O_3$ is higher than 2.5.

3. An article having a self-cleaning coating as set forth in claim 1 wherein the frit particles are bonded to said substrate and to each other.

4. An article having a self-cleaning coating as set forth in claim 1 wherein said self-cleaning coating comprises a first coating of frit particles bonded to said substrate and to each other, and a second coating which is applied over said first coating having a catalyst and frit particles bonded to each other.

5. An article having a self-cleaning coating as set forth in claim 1 wherein said self-cleaning coating comprises frit particles which are at least partially coated with the catalyst and bonded to each other.

6. An article having a self-cleaning coating as set forth in claim 1 wherein said self-cleaning coating comprises a first coating of frit particles bonded to the substrate and to each other, and a second coating which is applied over said first coating having frit particles, at least partially coated with the catalyst, bonded to each other and to said first coating.

7. An article having a self-cleaning coating as set forth in claim 1 wherein said self-cleaning coating contains matte surface-forming particles in addition to the catalyst particles.

8. An article having a self-cleaning coating as set forth in claim 1 wherein said catalyst is selected from the group consisting of manganese oxides and copper oxides.

9. An article having a self-cleaning coating as set forth in claim 7 wherein said matte surface-forming particles are selected from the group consisting of $Al_2O_3$, $SiO_2$, zeolite and $TiO_2$.

10. An article having a self-cleaning coating as set forth in claim 8 wherein the content of said catalyst contained in said self-cleaning coating is between 5 and 50% by weight.

11. An article having a self-cleaning coating as set forth in claim 9 wherein the content of said matte surface-forming agents is between 5 and 50% by weight.

12. The article of claim 1 wherein the frit is fused onto the substrate at a temperature of 400°–620° C.

UNITED STATES PATENT OFFICE
CERTIFICATE OF CORRECTION

Patent No. 4,147,835                    Dated April 3, 1979

Inventor(s)   Atsushi Nishino, et al

It is certified that error appears in the above-identified patent and that said Letters Patent are hereby corrected as shown below:

In the title page: Change name of last inventor from "Nasaki Ikeda" to --Masaki Ikeda--.

Column 2, line 54: "$\text{I-MnO}_2$" should be -- $\gamma\text{-MnO}_2$ --.

Column 3, line 35: Change "improved expansion" to --improved thermal expansion--.

Column 4, line 6: Change "and Within" to --Within--.

Column 8, line 61: Change "quentched" to --quenched--.

Column 10, line 6: Cancel "a".

line 53: change "self-cleaning" to --fused self-cleaning--.

Signed and Sealed this

Eighteenth Day of September 1979

[SEAL]

Attest:

LUTRELLE F. PARKER
Attesting Officer    Acting Commissioner of Patents and Trademarks

UNITED STATES PATENT AND TRADEMARK OFFICE
CERTIFICATE OF CORRECTION

PATENT NO. : 4,147,835
DATED : April 3, 1979
INVENTOR(S) : Atsushi Nishino, et al It is certified that error appears in the above—identified patent and that said Letters Patent is hereby corrected as shown below:

In column 5, line 1: "$Sb_2O$" should be --$Sb_2O_3$--.

line 54: "$SiO$" should be --$SiO_2$--.

In column 9, lines 49-50: "basic copper carbonate" should be --copper hydroxycarbonate--.

lines 58-59: "basic copper carbonate" should be --copper hydroxycarbonate--.

In column 10, line 28: "$TiO$" should be --$TiO_2$--.

line 29: "$SiO$" should be --$SiO_2$--.

In column 12, lines 24-25: "$CuCO_2Cu(OH)_2$ should be --$CuCO_3Cu(OH)_2$--.

Signed and Sealed this

Twelfth Day of February 1980

[SEAL]

Attest:

SIDNEY A. DIAMOND

Attesting Officer

Commissioner of Patents and Trademarks